United States Patent
Nanjo et al.

(10) Patent No.: US 11,161,583 B2
(45) Date of Patent: Nov. 2, 2021

(54) MARINE PROPULSION UNIT

(71) Applicant: YAMAHA HATSUDOKI KABUSHIKI KAISHA, Iwata (JP)

(72) Inventors: Morihiko Nanjo, Shizuoka (JP); Akihiro Onoue, Shizuoka (JP); Takahiro Oguma, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/928,027

(22) Filed: Jul. 14, 2020

(65) Prior Publication Data
US 2021/0024191 A1 Jan. 28, 2021

(30) Foreign Application Priority Data
Jul. 26, 2019 (JP) .............................. JP2019-137994

(51) Int. Cl.
B63H 20/14 (2006.01)
B63H 21/17 (2006.01)

(52) U.S. Cl.
CPC ............. B63H 20/14 (2013.01); B63H 21/17 (2013.01)

(58) Field of Classification Search
CPC ................................ B63H 21/17; B63H 20/14
See application file for complete search history.

(56) References Cited

U.S. PATENT DOCUMENTS

| 2008/0166934 A1* | 7/2008 | Levander ............... B63H 5/125 440/58 |
| 2015/0018170 A1 | 1/2015 | Hofer |
| 2016/0114877 A1 | 4/2016 | Hedlund |
| 2017/0349256 A1 | 12/2017 | Nakamura |

FOREIGN PATENT DOCUMENTS

| JP | 4241537 B2 | 3/2009 |
| JP | 4655783 B2 | 3/2011 |
| JP | 2017-218016 A | 12/2017 |

OTHER PUBLICATIONS

Official Communication issued in corresponding European Patent Application No. 20187570.5, dated Dec. 1, 2020.

* cited by examiner

Primary Examiner — Stephen P Avila
(74) Attorney, Agent, or Firm — Keating and Bennett, LLP

(57) ABSTRACT

A marine propulsion unit includes a motor driving force transmission shaft, a propeller shaft, and a shaft including one of a switching shaft and a drive shaft, and one of the motor driving force transmission shaft and the shaft includes a hollow member, and the other of the motor driving force transmission shaft and the shaft is disposed inside the hollow member.

20 Claims, 9 Drawing Sheets

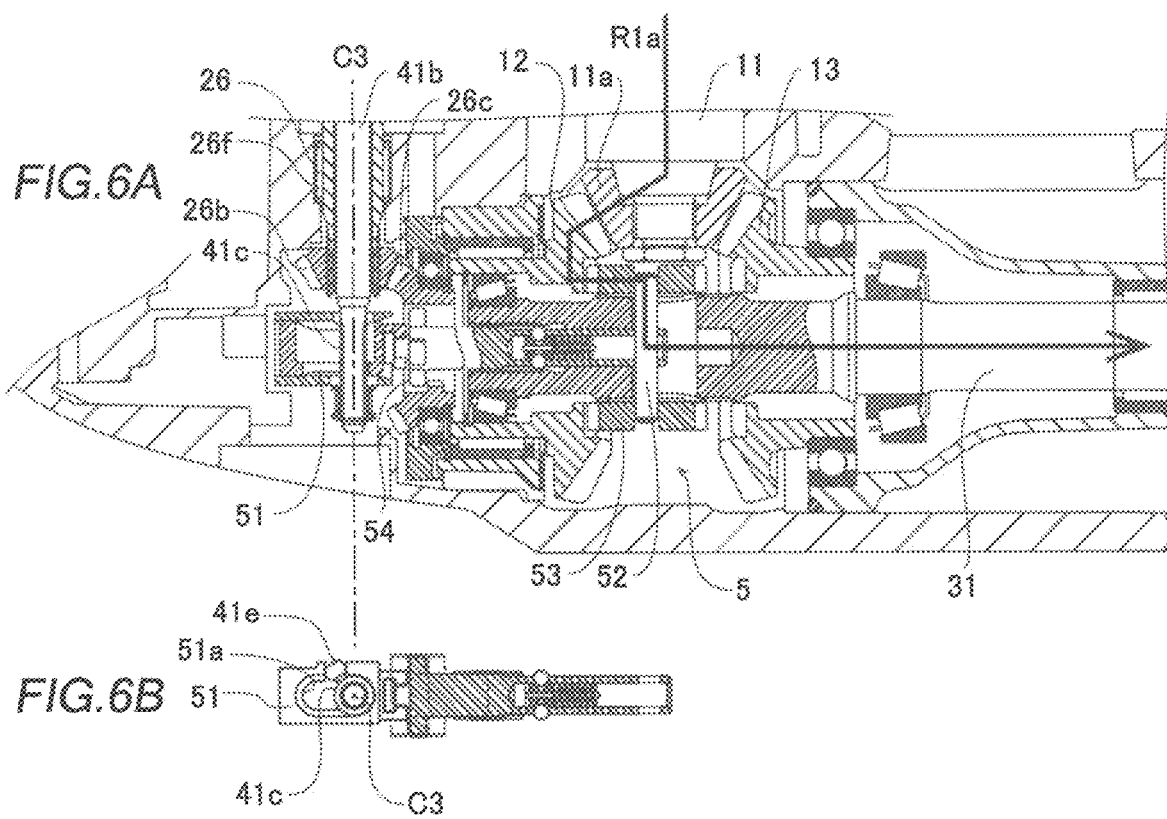
FIG.6A
FIG.6B
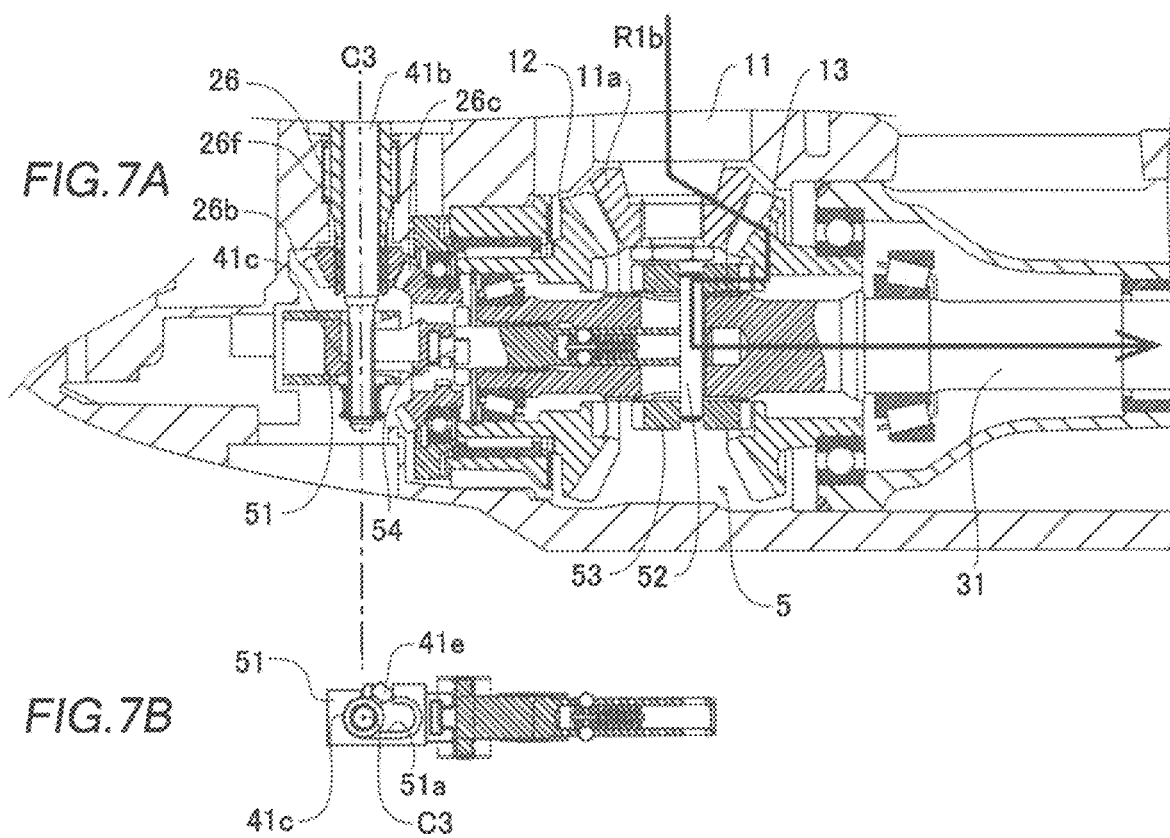
FIG.7A
FIG.7B

MARINE PROPULSION UNIT

CROSS REFERENCE TO RELATED APPLICATIONS

This application claims the benefit of priority to Japanese Patent Application No. 2019-137994 filed on Jul. 26, 2019. The entire contents of this application are hereby incorporated herein by reference.

BACKGROUND OF THE INVENTION

1. Field of the Invention

The present invention relates to a marine propulsion unit.

2. Description of the Related Art

A marine propulsion unit including an engine and an electric motor is known in general. Such a marine propulsion unit is disclosed in Japanese Patent Laid-Open No. 2017-218016, for example.

Japanese Patent Laid-Open No. 2017-218016 discloses an outboard motor (marine propulsion unit) including an engine and an electric motor. Both the engine and the electric motor generate power to rotate a propeller. Furthermore, the outboard motor includes a drive shaft that transmits a driving force from the engine to a propeller shaft connected to the propeller, an intermediate shaft that transmits a driving force from the electric motor to the propeller shaft, and a shift actuator, and a shift rod connected to the shift actuator. The outboard motor also includes a lower case that houses the propeller shaft, the drive shaft, the intermediate shaft, and the shift rod. The drive shaft, the intermediate shaft, and the shift rod are disposed side by side in a forward-rearward direction with a space therebetween in the lower case.

In the outboard motor described in Japanese Patent Laid-Open No. 2017-218016, the intermediate shaft (motor driving force transmission shaft) that transmits a driving force from the electric motor, the drive shaft, and the shift rod are disposed side by side in the forward-rearward direction in the lower case. Therefore, in order to transmit a driving force from the electric motor to the propeller shaft, the dimension of the lower case in the forward-rearward direction conceivably becomes large, and the underwater resistance of the lower case conceivably becomes large. Thus, conventionally, an outboard motor (marine propulsion unit) that significantly reduces or prevents an increase in underwater resistance even when an electric motor is provided in the outboard motor has been desired.

SUMMARY OF THE INVENTION

Preferred embodiments of the present invention provide marine propulsion units that each significantly reduce or prevent an increase in underwater resistance even when electric motors are provided in the marine propulsion units.

A marine propulsion unit according to a preferred embodiment of the present invention includes an electric motor, an engine, a motor driving force transmission shaft that rotates due to a driving force from the electric motor, a propeller shaft that rotates together with a propeller, and a shaft including one of a switching shaft that switches between a state in which a driving force is transmitted from the engine to the propeller shaft and a state in which a driving force is transmitted from the electric motor to the propeller shaft and a drive shaft that rotates due to a driving force from the engine. One of the motor driving force transmission shaft and the shaft includes a hollow member, and the other of the motor driving force transmission shaft and the shaft is disposed inside the hollow member.

In a marine propulsion unit according to a preferred embodiment of the present invention, as described above, one of the motor driving force transmission shaft and the shaft including one of the switching shaft and the drive shaft includes the hollow member, and the other is disposed inside the hollow member. Accordingly, one of the motor driving force transmission shaft and the shaft is disposed inside the other. Consequently, as compared with a case in which the motor driving force transmission shaft and the shaft are disposed side by side in the forward-rearward direction, an increase in the dimensions of the motor driving force transmission shaft and the shaft in the forward-rearward direction in the marine propulsion unit is significantly reduced or prevented. Furthermore, as compared with a case in which the motor driving force transmission shaft and the shaft are disposed side by side in the right-left direction, an increase in the dimensions of the motor driving force transmission shaft and the shaft in the right-left direction in the marine propulsion unit is significantly reduced or prevented. Consequently, an increase in the size of a portion (lower case) of the marine propulsion unit that houses the motor driving force transmission shaft and the shaft is significantly reduced or prevented. Thus, even when the electric motor is provided in the marine propulsion unit, an increase in the underwater resistance of a portion (lower case) positioned in the water is significantly reduced or prevented.

In a marine propulsion unit according to a preferred embodiment of the present invention, the motor driving force transmission shaft preferably includes the hollow member, and the shaft is preferably disposed inside the motor driving force transmission shaft, and preferably includes a solid member. Accordingly, the solid switching shaft or the solid drive shaft is disposed inside the hollow motor driving force transmission shaft, and thus even when the electric motor and the motor driving force transmission shaft are provided in the marine propulsion unit, an increase in the size of the portion (lower case) positioned in the water is significantly reduced or prevented.

In such a case, the shaft preferably axially penetrates the motor driving force transmission shaft. Accordingly, even when an actuator or the engine that operates the shaft including one of the switching shaft and the drive shaft is axially spaced apart from the motor driving force transmission shaft, a driving force is easily transmitted to the shaft that penetrates the motor driving force transmission shaft.

In a marine propulsion unit including the motor driving force transmission shaft including the hollow member, the shaft preferably includes the switching shaft, and the switching shaft is preferably disposed inside the motor driving force transmission shaft. Accordingly, as compared with a case in which the switching shaft and the motor driving force transmission shaft are disposed side by side in the forward-rearward direction or the right-left direction, an increase in the total size of the switching shaft and the motor driving force transmission shaft in the forward-rearward direction, or an increase in the total size of the switching shaft and the motor driving force transmission shaft in the right-left direction is significantly reduced or prevented.

In such a case, the switching shaft and the motor driving force transmission shaft are preferably disposed coaxially or substantially coaxially. When the switching shaft and the motor driving force transmission shaft are disposed on different axes from each other, the axes are misaligned with each other, and thus it is necessary to increase a distance between the outer peripheral surface of the switching shaft and the inner peripheral surface of the hollow motor driving force transmission shaft. In such a case, the size of the motor driving force transmission shaft is increased in a radial direction. In this regard, according to a preferred embodiment of the present invention, the switching shaft and the motor driving force transmission shaft are disposed coaxially or substantially coaxially such that the outer peripheral surface of the switching shaft and the inner peripheral surface of the motor driving force transmission shaft are close to each other. Consequently, an increase in the size of the motor driving force transmission shaft in the radial direction is significantly reduced or prevented, and thus an increase in the size of the portion of the marine propulsion unit positioned in the water is further significantly reduced or prevented.

In a marine propulsion unit according to a preferred embodiment of the present invention, the electric motor is preferably disposed forward of or rearward of the motor driving force transmission shaft and the shaft, and the marine propulsion unit preferably further includes a first motor gearing disposed between the electric motor and the motor driving force transmission shaft in a forward-rearward direction, the first motor gearing transmitting the driving force from the electric motor to the motor driving force transmission shaft. Accordingly, using the first motor gearing, a driving force is easily transmitted from the electric motor to the motor driving force transmission shaft. That is, it is not necessary to prepare an electric motor specially designed for the motor driving force transmission shaft, and thus the marine propulsion unit including the electric motor is easily configured.

In such a case, the first motor gearing preferably includes a speed reducer. Accordingly, even when a small electric motor in which the rotational force (torque) of the electric motor is relatively small is used, a driving force is transmitted to the motor driving force transmission shaft while the rotational force (torque) is increased by the speed reducer. Consequently, the electric motor is downsized, and thus an increase in the size of the marine propulsion unit is significantly reduced or prevented.

In a marine propulsion unit including the first motor gearing, the electric motor is preferably disposed forward of the motor driving force transmission shaft and the shaft. Accordingly, the motor driving force transmission shaft and the shaft are disposed relatively rearward. Therefore, the front end of a lower portion (lower case) of the marine propulsion unit in which the motor driving force transmission shaft and the shaft are disposed is positioned relatively rearward. Consequently, when the marine propulsion unit is tilted rearward and upward, an angle required for tilting-up is reduced.

A marine propulsion unit including the first motor gearing preferably further includes an anti-cavitation plate disposed above the propeller, and the electric motor and the first motor gearing are preferably disposed above the anti-cavitation plate. When the marine vessel is gliding in a high-speed range propelled by the marine propulsion unit (during high-speed operation), a portion of the marine propulsion unit positioned below the anti-cavitation plate is located in the water, whereas a portion of the marine propulsion unit positioned above the anti-cavitation plate is located above the water surface. In consideration of this point, according to a preferred embodiment of the present invention, the electric motor and the first motor gearing are disposed above the anti-cavitation plate such that the electric motor and the first motor gearing are not disposed in a portion of the marine propulsion unit at the same height as or below the anti-cavitation plate, and thus an increase in the size of the portion at the same height as or below the anti-cavitation plate is significantly reduced or prevented. Consequently, even when the electric motor and the first motor gearing are provided in the marine propulsion unit, an increase in the underwater resistance of the portion at the same height as or below the anti-cavitation plate is significantly reduced or prevented. The "high-speed range" refers to a speed range that is equal to or higher than a medium-high speed and equal to or lower than a maximum speed.

In a marine propulsion unit according to a preferred embodiment of the present invention, the electric motor preferably surrounds an outer periphery of the motor driving force transmission shaft, the motor driving force transmission shaft preferably includes the hollow member, and the shaft preferably axially penetrates the motor driving force transmission shaft and the electric motor. Accordingly, a transmission path of a driving force from the electric motor to the motor driving force transmission shaft is simplified. Consequently, the transmission path is simplified such that a loss of transmission of a driving force from the electric motor to the motor driving force transmission shaft is reduced.

In such a case, the electric motor is preferably integral and unitary with the motor driving force transmission shaft. Accordingly, a transmission that transmits a driving force from the electric motor to the motor driving force transmission shaft is not necessary. Consequently, the transmission path from the electric motor to the motor driving force transmission shaft is further simplified, and thus a loss of transmission of a driving force from the electric motor to the motor driving force transmission shaft is further reduced.

In a marine propulsion unit according to a preferred embodiment of the present invention, the motor driving force transmission shaft preferably includes the hollow member, the shaft is preferably disposed inside the motor driving force transmission shaft, and the marine propulsion unit preferably further includes a second motor gearing disposed in a lower portion of the motor driving force transmission shaft, the second motor gearing transmitting a driving force from the motor driving force transmission shaft to the propeller shaft, and a cylindrical member disposed between an outer peripheral surface of the shaft and an inner peripheral surface of the motor driving force transmission shaft, the cylindrical member being disposed at a position corresponding to the second motor gearing. Accordingly, when a driving force is transmitted from the motor driving force transmission shaft to the propeller shaft, a change in the positional relationship between the motor driving force transmission shaft and the shaft is significantly reduced or prevented by the cylindrical member even when a pressing force is applied to the second motor gearing from the side of the propeller shaft.

In a marine propulsion unit according to a preferred embodiment of the present invention, the shaft preferably includes the switching shaft, the switching shaft preferably includes a protrusion that protrudes downward from the motor driving force transmission shaft, and the marine propulsion unit preferably further includes a slider that engages with the protrusion of the switching shaft, the slider being moved by the switching shaft, and a clutch that switches between a state in which a driving force is transmitted from the motor driving force transmission shaft to the propeller shaft and a state in which a driving force is not transmitted from the motor driving force transmission shaft to the propeller shaft according to movement of the slider. Accordingly, even when the switching shaft is disposed inside the motor driving force transmission shaft, the slider is moved by the protrusion of the switching shaft without interference of the motor driving force transmission shaft with the operation of the switching shaft so that the clutch is able to operate.

In such a case, the switching shaft preferably rotates about a central axis of the switching shaft to move the slider. Accordingly, the slider is easily moved by rotating the switching shaft disposed inside the motor driving force transmission shaft.

A marine propulsion unit according to a preferred embodiment of the present invention preferably further includes a water pump driven by rotation of the drive shaft, a first transmission path through which a driving force is transmitted from the drive shaft to the propeller shaft, and a second transmission path that is provided separately from the first transmission path and through which a driving force is transmitted from the motor driving force transmission shaft to the propeller shaft. Accordingly, a driving force is transmitted from the motor driving force transmission shaft to the propeller shaft via the second transmission path provided separately from the first transmission path, and thus a driving force is transmitted from the motor driving force transmission shaft to the propeller shaft without having to also drive the water pump. Consequently, a loss of a driving force from the electric motor is reduced.

In such a case, the electric motor and the water pump preferably overlap each other at a predetermined height. Accordingly, unlike a case in which the electric motor and the water pump do not overlap each other at the predetermined height, an increase in the total size of the electric motor and the water pump in the upward-downward direction (height direction) is significantly reduced or prevented.

A marine propulsion unit according to a preferred embodiment of the present invention preferably further includes an anti-cavitation plate disposed above the propeller, and at least a portion of the electric motor is preferably disposed above the anti-cavitation plate. Accordingly, the electric motor is not disposed in the portion of the marine propulsion unit at the same height as or below the anti-cavitation plate, and thus an increase in the size of the portion at the same height as or below the anti-cavitation plate is significantly reduced or prevented. Consequently, an increase in the underwater resistance of the portion at the same height as or below the anti-cavitation plate is significantly reduced or prevented.

A marine propulsion unit according to a preferred embodiment of the present invention preferably further includes a steering shaft to turn a hull, and the shaft, the motor driving force transmission shaft, and the steering shaft are preferably disposed coaxially or substantially coaxially. Accordingly, as compared with a case in which the shaft, the motor driving force transmission shaft, and the steering shaft are disposed on different axes from each other, an increase in the size of the marine propulsion unit in the forward-rearward direction or the right-left direction is significantly reduced or prevented.

In such a case, a marine propulsion unit preferably further includes an actuator to move or rotate the switching shaft, the shaft preferably includes the switching shaft, and at least a portion of the electric motor is preferably disposed below the actuator. Accordingly, unlike a case in which the electric motor is disposed above the actuator and the actuator is disposed relatively downward, an increase in the size of a lower portion of the marine propulsion unit is significantly reduced or prevented. Consequently, even when the actuator is provided in the marine propulsion unit, an increase in the underwater resistance of the lower portion of the marine propulsion unit is significantly reduced or prevented.

In a marine propulsion unit according to a preferred embodiment of the present invention, the motor driving force transmission shaft preferably includes the hollow member, and the marine propulsion unit preferably further includes a cowling that houses the engine, an upper case that houses at least a portion of the electric motor, and a lower case that houses the shaft and the motor driving force transmission shaft in a state in which the shaft is disposed inside the motor driving force transmission shaft. Accordingly, the motor driving force transmission shaft and the shaft disposed inside the motor driving force transmission shaft are housed in the lower case, and thus an increase in the size of the lower case is significantly reduced or prevented. Therefore, even when the electric motor is provided in the marine propulsion unit, an increase in the underwater resistance of the lower case is effectively significantly reduced or prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6A is a sectional view showing a transmission path to illustrate transmission (forward movement direction) of a driving force from an engine according to the first preferred embodiment of the present invention.

FIG. 6B is a sectional view showing the position of a slider to illustrate transmission (forward movement direction) of a driving force from the engine according to the first preferred embodiment of the present invention.

FIG. 7A is a sectional view showing a transmission path to illustrate transmission (reverse movement direction) of a driving force from the engine according to the first preferred embodiment of the present invention.

FIG. 7B is a sectional view showing the position of the slider to illustrate transmission (reverse movement direction) of a driving force from the engine according to the first preferred embodiment of the present invention.

DETAILED DESCRIPTION OF THE PREFERRED EMBODIMENTS

Preferred embodiments of the present invention are hereinafter described with reference to the drawings.

First Preferred Embodiment

The structure of an outboard motor 100 according to a first preferred embodiment of the present invention is now described with reference to FIGS. 1 to 9. The outboard motor 100 is an example of a "marine propulsion unit".

Figure 1:
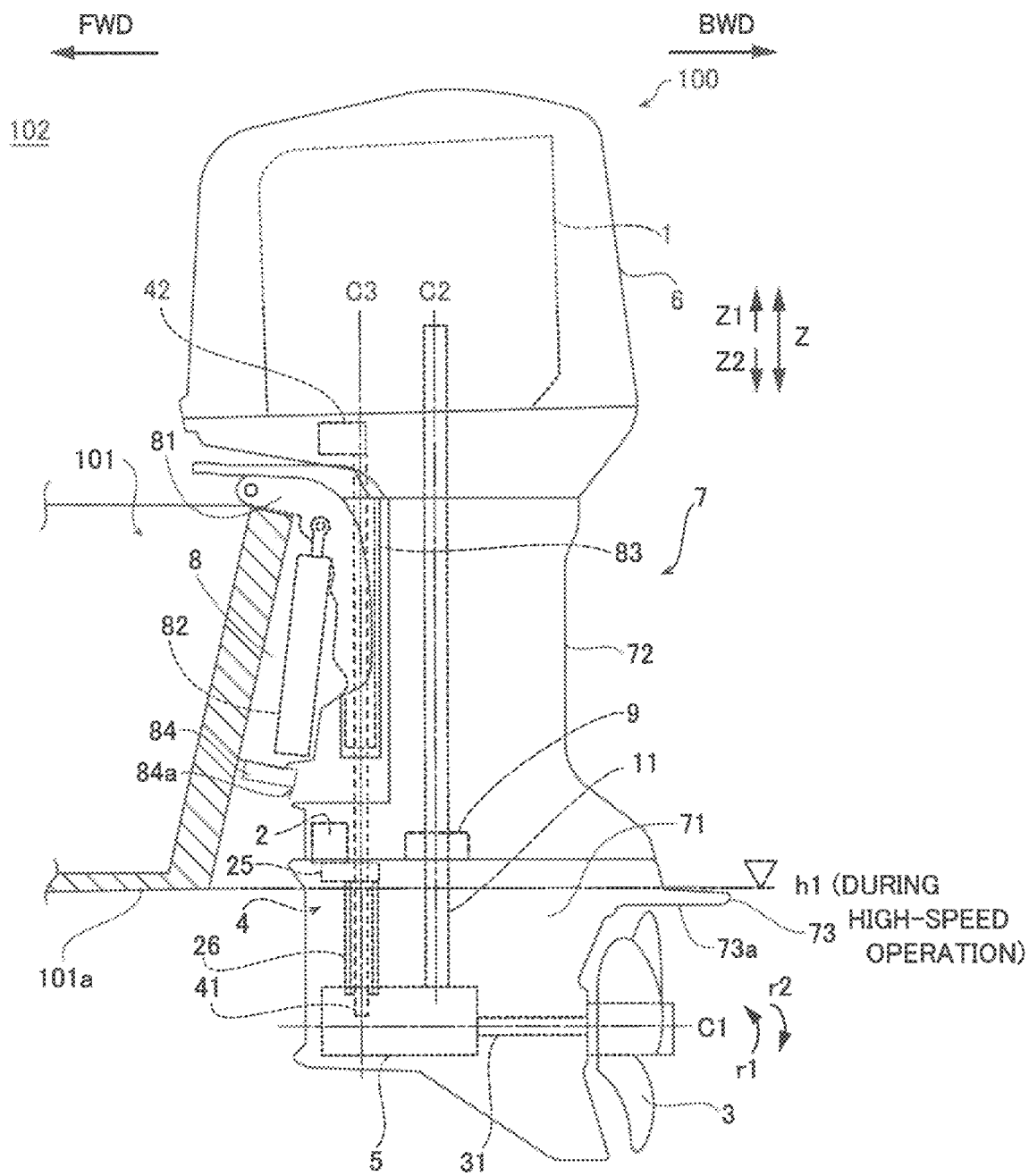
FIG. 1 is a side view schematically showing the overall structure of an outboard motor according to a first preferred embodiment of the present invention.

As shown in FIG. 1, the outboard motor 100 is attached to a portion (rear portion) of a hull 101 in a BWD direction, for example. A marine vessel 102 includes the outboard motor 100 and the hull 101.

In the following description, the term "front (forward)" refers to the forward movement direction (a direction indicated by "FWD" in the figures) of the marine vessel 102, and the term "rear (rearward)" refers to a direction indicated by "BWD" in the figures. Furthermore, a "forward-rearward direction" refers to the forward-rearward direction of the marine vessel 102 (outboard motor 100) and a direction (a direction along an axis C1) parallel to a propeller shaft 31 described below, for example. An "upward-downward direction" refers to the trim/tilt direction of the outboard motor 100, an "upward direction" refers to an "arrow Z1 direction", and a "downward direction" refers to an "arrow Z2 direction". A "right-left direction" refers to a direction perpendicular to the upward-downward direction and a direction perpendicular to the forward-rearward direction. A "horizontal direction" refers to a direction along a horizontal plane perpendicular to the upward-downward direction and a steering direction.

The bottom 101a of the hull 101 is located at substantially the same height h1 as that of an anti-cavitation plate 73 (hereinafter referred to as a "plate 73") of the outboard motor 100, or above (for example, several centimeters above) the plate 73.

As shown in FIG. 1, the outboard motor 100 includes an engine 1, an electric motor 2, a propeller 3, a switch 4, a clutch 5, a cowling 6, a case 7, a bracket 8, and a water pump 9.

The engine 1 is preferably an internal combustion engine that generates a driving force by combustion of fuel. The outboard motor 100 also includes a drive shaft 11 that extends in the upward-downward direction. The drive shaft 11 rotates about a central axis C2 due to the driving force from the engine 1. Specifically, the drive shaft 11 is connected to a crankshaft (not shown) of the engine 1.

Figure 2:
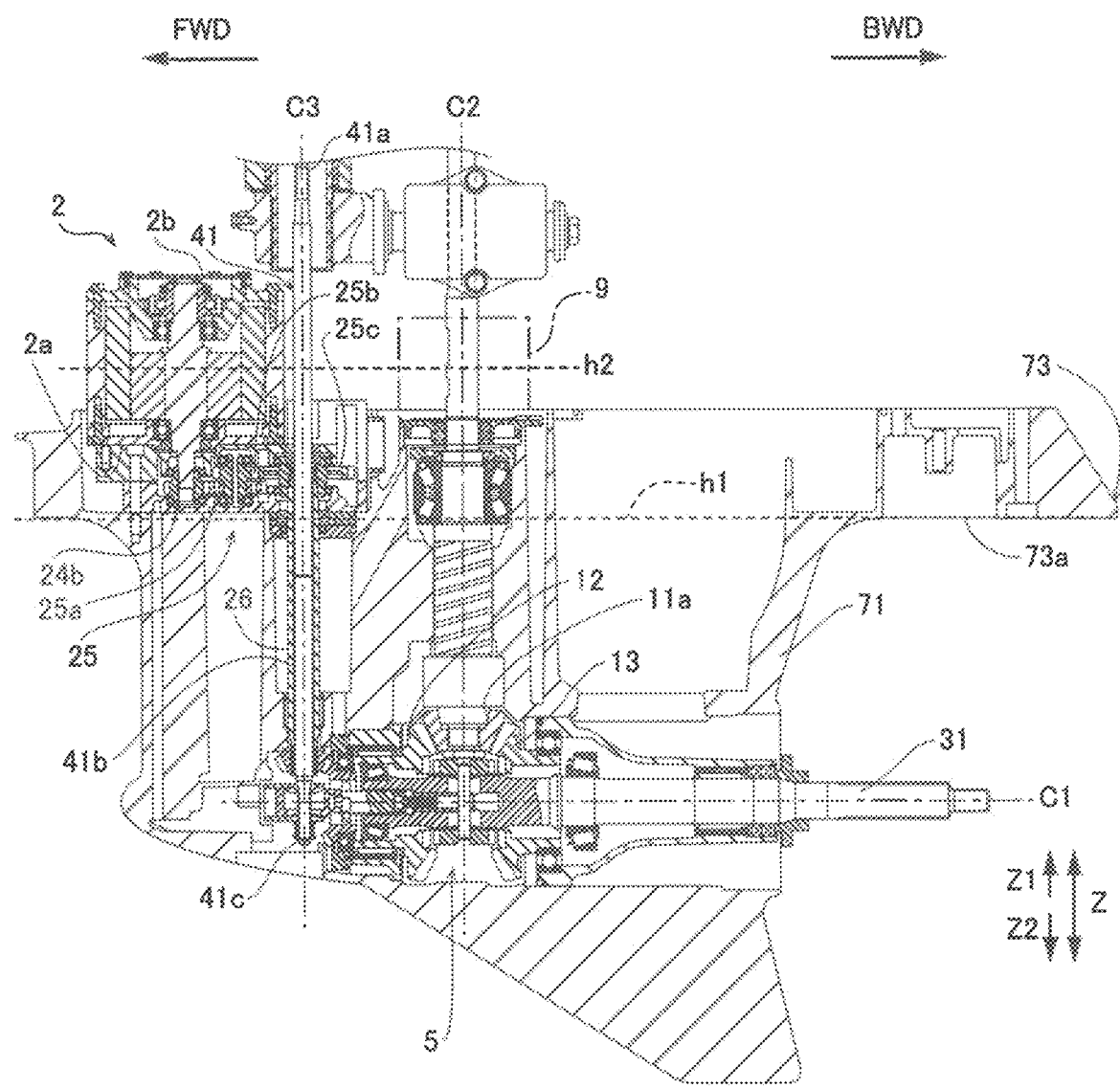
FIG. 2 is a sectional view showing the structure of the outboard motor according to the first preferred embodiment of the present invention.

As shown in FIG. 2, a first bevel gear 11a is provided at the lower end of the drive shaft 11. Furthermore, the outboard motor 100 includes a second front bevel gear 12 and a second rear bevel gear 13. The second front bevel gear 12 is disposed forward of the drive shaft 11, and engages with the first bevel gear 11a. The second rear bevel gear 13 is disposed rearward of the drive shaft 11, and engages with the first bevel gear 11a. Thus, when the drive shaft 11 rotates, both the second front bevel gear 12 and the second rear bevel gear 13 are rotated. The second front bevel gear 12 and the second rear bevel gear 13 are rotated in opposite directions. A driving force is transmitted from the engine 1 to the propeller 3 (see FIG. 1) via the second front bevel gear 12 or the second rear bevel gear 13, the clutch 5, and the propeller shaft 31 described below.

Figure 3:
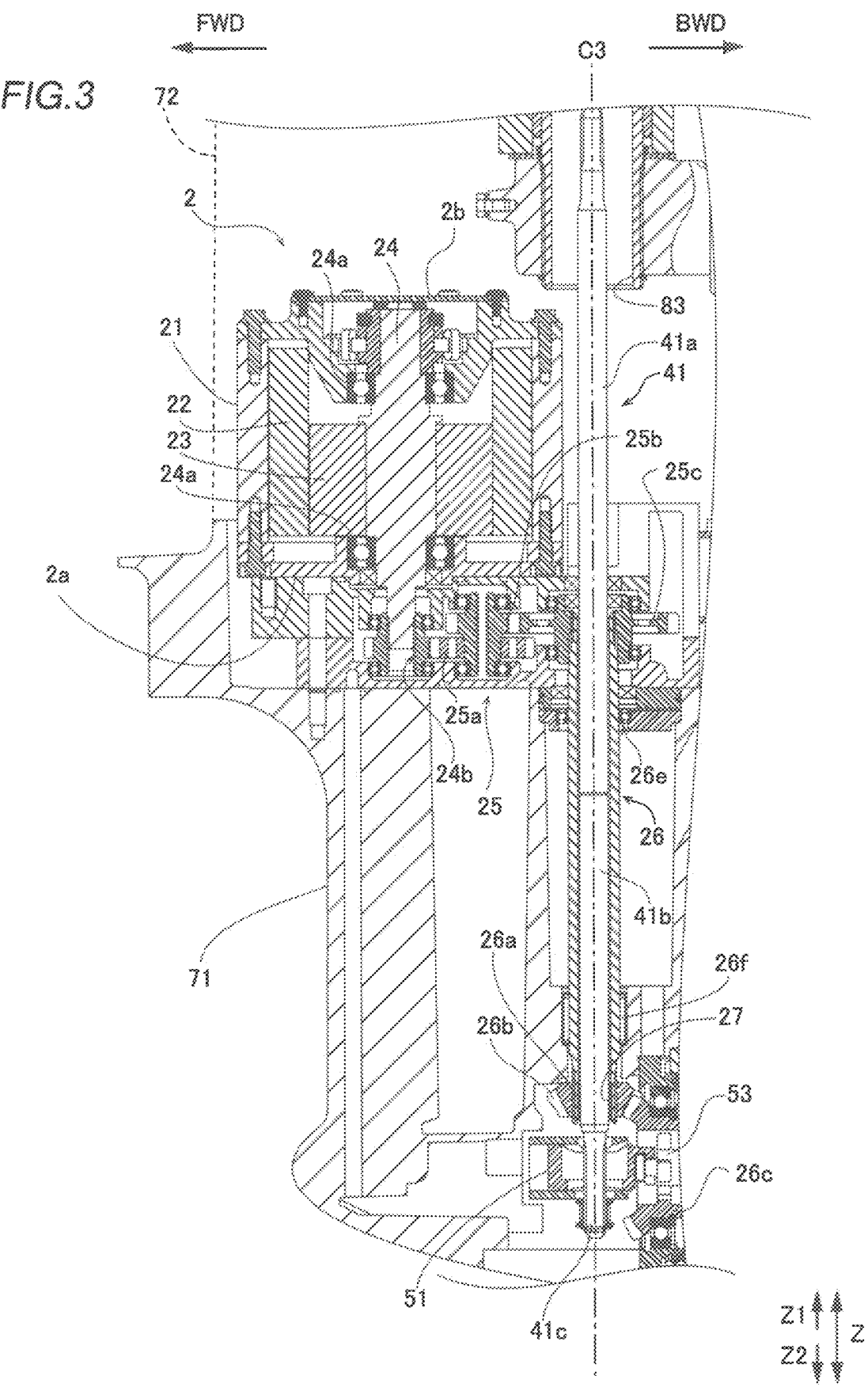
FIG. 3 is a sectional view showing the structure of an electric motor, a transmission shaft, and a switching shaft according to the first preferred embodiment of the present invention.

As shown in FIG. 3, the electric motor 2 includes a motor case 21, a stator 22, a rotor 23, a motor shaft 24, and bearings 24a. The electric motor 2 generates a driving force when electric power is supplied thereto. The outboard motor 100 also includes a transmission shaft 26. The transmission shaft 26 is an example of a "motor driving force transmission shaft".

The motor case 21 houses the stator 22, the rotor 23, and the bearings 24a. The motor case 21 houses an upper portion of the motor shaft 24. The motor case 21 is disposed in an upper case 72 described below, and a lower portion of the motor case 21 is disposed in a lower case 71.

The stator 22 is fixed to the motor case 21. The rotor 23 is disposed inward of the stator 22, and rotates with respect to the stator 22. The motor shaft 24 is fixed to the rotor 23, and rotates integrally with the rotor 23. A lower portion of the motor shaft 24 protrudes downward from the motor case 21. The bearings 24a rotatably support the motor shaft 24.

As shown in FIG. 2, in the first preferred embodiment, at least a portion of the electric motor 2 is disposed above the plate 73. Specifically, the lower end 2a of the electric motor 2 is located above the lower end 73a of the plate 73. As shown in FIG. 1, the electric motor 2 is disposed below an anode 84. For example, the upper end 2b of the electric motor 2 is disposed below the lower end 84a of the anode 84. That is, the upper end 2b of the electric motor 2 is located below the lower end 84a of the bracket 8. The electric motor 2 is disposed forward of the transmission shaft 26 and a switching shaft 41.

As shown in FIG. 2, the electric motor 2 and the water pump 9 overlap each other at a predetermined height h2. The predetermined height h2 refers to a position between the upper end and the lower end of the water pump 9 and a position between the upper end and the lower end of the electric motor 2. The lower end 2a of the electric motor 2 is located above the bottom 101a of the hull 101. Furthermore, the electric motor 2 is disposed below an actuator 42 (see FIG. 1) described below.

The electric motor 2 is disposed forward of the drive shaft 11, the transmission shaft 26 described below, and the switching shaft 41 described below.

As shown in FIG. 3, the outboard motor 100 includes a speed reduction gearing 25. The motor shaft 24 transmits a driving force from the electric motor 2 to the speed reduction gearing 25. The speed reduction gearing 25 includes a first gear 25a, a second gear 25b, and a third gear 25c. A gear 24b is provided on a portion of the motor shaft 24 that protrudes downward from the motor case 21. As shown in FIG. 2, the gear 24b and the speed reduction gearing 25 (the first gear 25a, the second gear 25b, and the third gear 25c) are disposed above the lower end 73a of the plate 73. The speed reduction gearing 25 (the first gear 25a, the second gear 25b, and the third gear 25c) is an example of a "first motor gearing" or a "speed reducer".

The speed reduction gearing 25 is disposed between the electric motor 2 and the transmission shaft 26 in the forward-rearward direction. Specifically, the gear 24b, the first gear 25a (second gear 25b), and the third gear 25c are disposed side by side in this order from the front side to the rear side. The first gear 25a is disposed adjacent to the gear 24b rearward of the gear 24b. The second gear 25b is disposed coaxially with the first gear 25a and above the first gear 25a. The second gear 25b rotates integrally with the first gear 25a. The third gear 25c is disposed adjacent to the second gear 25b rearward of the second gear 25b. The third gear 25c is fixed to the outer periphery of the transmission shaft 26. Thus, the third gear 25c and the transmission shaft 26 rotate integrally.

The gear 24b is fixed to the motor shaft 24 so as to rotate integrally with the motor shaft 24. The gear 24b and the first gear 25a engage with each other. Furthermore, the second gear 25b and the third gear 25c engage with each other. The first gear 25a and the second gear 25b transmit a rotational force from the gear 24b to the third gear 25c. The speed reduction gearing 25 transmits a driving force from the electric motor 2 to the transmission shaft 26 while reducing a speed of rotation from the electric motor 2 and improving a force of rotation from the electric motor 2. For example, due to at least one of the first gear 25a having a larger number of teeth than that of the gear 24b and the third gear 25c having a larger number of teeth than that of the second gear 25b, the rotation speed of the third gear 25c is lower than the rotation speed of the gear 24b. Thus, a driving force is transmitted from the electric motor 2 to the transmission shaft 26 in a state in which a speed of rotation from the electric motor 2 is reduced and a force of rotation from the electric motor 2 is increased.

Figure 4:
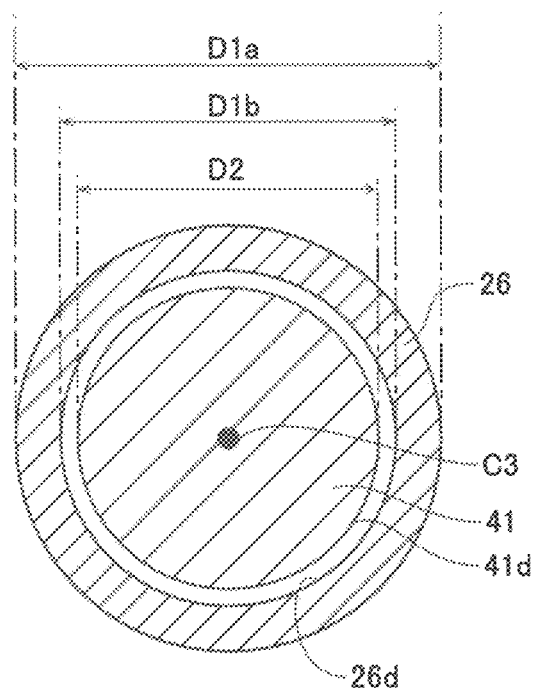
FIG. 4 is a sectional view showing the structure of the transmission shaft and the switching shaft according to the first preferred embodiment of the present invention.

As shown in FIG. 4, in the first preferred embodiment, the transmission shaft 26 includes a hollow member (pipe-shaped member). Specifically, the transmission shaft 26 has an outer diameter D1a and an inner diameter D1b with respect to a central axis C3. As shown in FIG. 3, the transmission shaft 26 extends in the upward-downward direction, and is disposed forward of the drive shaft 11. The transmission shaft 26 is disposed in the lower case 71. The transmission shaft 26 transmits a driving force from the electric motor 2 to the propeller 3 via the clutch 5 and the propeller shaft 31.

A first motor bevel gear 26b is provided on the outer peripheral surface of the lower tip 26a of the transmission shaft 26. The outboard motor 100 includes a second motor bevel gear 26c that engages with the first motor bevel gear 26b.

In the first preferred embodiment, a driving force is transmitted from the electric motor 2 to the propeller shaft 31 via a transmission path R2 (see FIG. 8) provided separately from transmission paths R1a (see FIGS. 6A and 6B) and R1b (see FIGS. 7A and 7B), described below, through which a driving force is transmitted from the engine 1 to the propeller shaft 31. The transmission path R2 is a path of the electric motor 2, the speed reduction gearing 25, the transmission shaft 26, the first motor bevel gear 26b, the second motor bevel gear 26c, the clutch 5, and the propeller shaft 31 in this order. That is, the transmission shaft 26 rotates due to a driving force from the electric motor 2 via the speed reduction gearing 25 such that the first motor bevel gear 26b and the second motor bevel gear 26c are rotated. When the second motor bevel gear 26c is rotated, a rotational force (driving force) is transmitted to the propeller 3 via the clutch 5 and the propeller shaft 31. The first motor bevel gear 26b and the second motor bevel gear 26c are examples of a "second motor gearing". The transmission paths R1a and R1b are examples of a "first transmission path". The transmission path R2 is an example of a "second transmission path".

As shown in FIG. 3, the outboard motor 100 includes bearings 26e and 26f that rotatably support the transmission shaft 26. The bearing 26e is disposed below the speed reduction gearing 25 and on an upper portion of the transmission shaft 26. The bearing 26f is disposed above the first motor bevel gear 26b and on a lower portion of the transmission shaft 26.

As shown in FIG. 1, the propeller 3 rotates due to a driving force from the engine 1 and a driving force from the electric motor 2. The propeller 3 rotates to generate a propulsive force. The outboard motor 100 includes the propeller shaft 31 that rotates integrally with the propeller 3 about the central axis C1. The propeller shaft 31 extends in the forward-rearward direction. That is, the propeller shaft 31 is positioned perpendicular or substantially perpendicular to the drive shaft 11, and is positioned perpendicular or substantially perpendicular to the transmission shaft 26.

As shown in FIG. 1, the switch 4 switches a path (the transmission path R1a, R1b, or R2) of a driving force to be transmitted to the propeller 3. The switch 4 includes the switching shaft 41 and the electric actuator 42 that rotates the switching shaft 41. That is, the switch 4 is a shift switch or a selector. The switching shaft 41 is an example of a "shaft".

The switching shaft 41 switches a transmission path of a driving force to the transmission path R1a (see FIGS. 6A and 6B) through which a driving force is transmitted as a rotational force in the forward movement direction from the engine 1 to the propeller shaft 31, the transmission path R1b (see FIGS. 7A and 7B) through which a driving force is transmitted as a rotational force in the reverse movement direction from the engine 1 to the propeller shaft 31, or the transmission path R2 (see FIG. 8) through which a driving force is transmitted from the electric motor 2 to the propeller shaft 31. That is, the switching shaft 41 is a change rod, a shift shaft (shift rod), or a select shaft (select rod).

As shown in FIG. 3, the switching shaft 41 extends in the upward-downward direction, and is disposed in the lower case 71. Furthermore, the switching shaft 41 extends from the lower case 71 to the cowling 6 via the inside of a steering shaft 83 described below. The switching shaft 41 is also disposed inside the transmission shaft 26. The switching shaft 41 axially penetrates the transmission shaft 26. That is, the switching shaft 41 includes an upper portion 41a that protrudes upward of the transmission shaft 26, an intermediate portion 41b disposed inside the transmission shaft 26, and a lower portion 41c that protrudes downward of the transmission shaft 26. The upper portion 41a is disposed inside the third gear 25c. The outer peripheral surface of the upper portion 41a and the inner peripheral surface of the third gear 25c are spaced apart from each other (with a gap therebetween). The lower portion 41c is an example of a "protrusion".

As shown in FIG. 4, the switching shaft 41 includes a solid member and has a diameter D2, which is smaller than the inner diameter D1b of the transmission shaft 26, about the central axis C3. That is, the switching shaft 41 and the transmission shaft 26 are disposed coaxially or substantially coaxially (on the central axis C3). In other words, the central axis C3 of the transmission shaft 26 is positioned inward of the outer peripheral surface 41d of the switching shaft 41. Furthermore, the central axis C3 of the switching shaft 41 is positioned inward of the outer peripheral surface of the transmission shaft 26.

Figure 5:
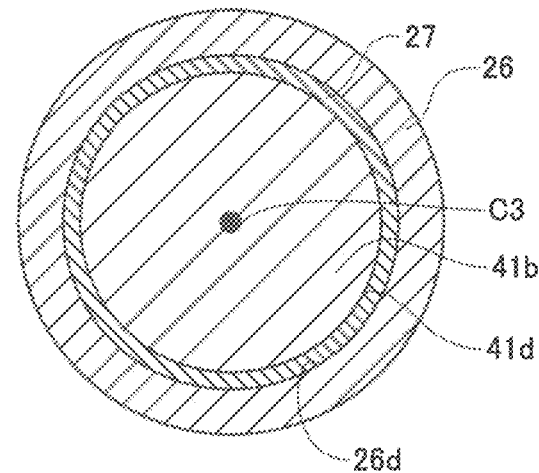
FIG. 5 is a sectional view showing the structure of a bushing according to the first preferred embodiment of the present invention.

As shown in FIG. 5, the outboard motor 100 includes a bushing 27. The bushing 27 is disposed between the outer peripheral surface 41d of the intermediate portion 41b of the switching shaft 41 and the inner peripheral surface 26d of the transmission shaft 26. The bushing 27 maintains a distance between the outer peripheral surface 41d of the switching shaft 41 and the inner peripheral surface 26d of the transmission shaft 26 substantially constant, and slides with at least one of the outer peripheral surface 41d of the switching shaft 41 and the inner peripheral surface 26d of the transmission shaft 26. The bushing 27 is an example of a "cylindrical member".

As shown in FIGS. 6A and 6B, the lower portion 41c includes an eccentric portion 41e. The eccentric portion 41e is deviated in the horizontal plane from the central axis C3 about which the switching shaft 41 rotates. Thus, when the switching shaft 41 rotates about the central axis C3, the position of the eccentric portion 41e changes in the forward-rearward direction. That is, the lower portion 41c is a cam. FIGS. 6A and 6B show a state in which the eccentric portion 41e has moved forward, FIGS. 7A and 7B show a state in which the eccentric portion 41e has moved rearward, and FIG. 8 shows a state in which the eccentric portion 41e is positioned at an intermediate position.

As shown in FIG. 1, the actuator 42 is disposed in the cowling 6. The actuator 42 includes a motor, for example, and rotates the switching shaft 41 about the central axis C3 based on a command signal from an engine control unit (ECU) (not shown).

As shown in FIGS. 6A and 6B to 8, the clutch 5 includes a slider 51, a connector 52, dog clutches 53, and a motor clutch 54. The slider 51 is disposed forward of the propeller shaft 31, and slides in the forward-rearward direction in which the propeller shaft 31 extends. The slider 51 engages with the eccentric portion 41e of the lower portion 41c of the switching shaft 41, and is moved by the switching shaft 41. The clutch 5 switches between a state in which a driving force is transmitted from the transmission shaft 26 to the propeller shaft 31 and a state in which a driving force is not transmitted according to movement of the slider 51. Furthermore, the clutch 5 switches between a state in which a driving force is transmitted from the drive shaft 11 to the propeller shaft 31 and a state in which a driving force is not transmitted according to movement of the slider 51.

Specifically, the eccentric portion 41e is disposed in a hole 51a of the slider 51. When the switching shaft 41 rotates, the eccentric portion 41e moves in the forward-rearward direction, and the position of the slider 51 in the forward-rearward direction changes. That is, the switching shaft 41 rotates about the central axis C3 of the switching shaft 41 to move the slider 51.

The connector 52 extends in the upward-downward direction perpendicular to the slider 51. The dog clutches 53 are disposed at both ends of the connector 52. The motor clutch 54 includes a portion that protrudes outward in a radial direction (to the side of the second motor bevel gear 26c) forward of the dog clutches 53.

The connector 52, the dog clutches 53, and the motor clutch 54 are movable in the forward-rearward direction as the slider 51 slides.

Figure 8A:
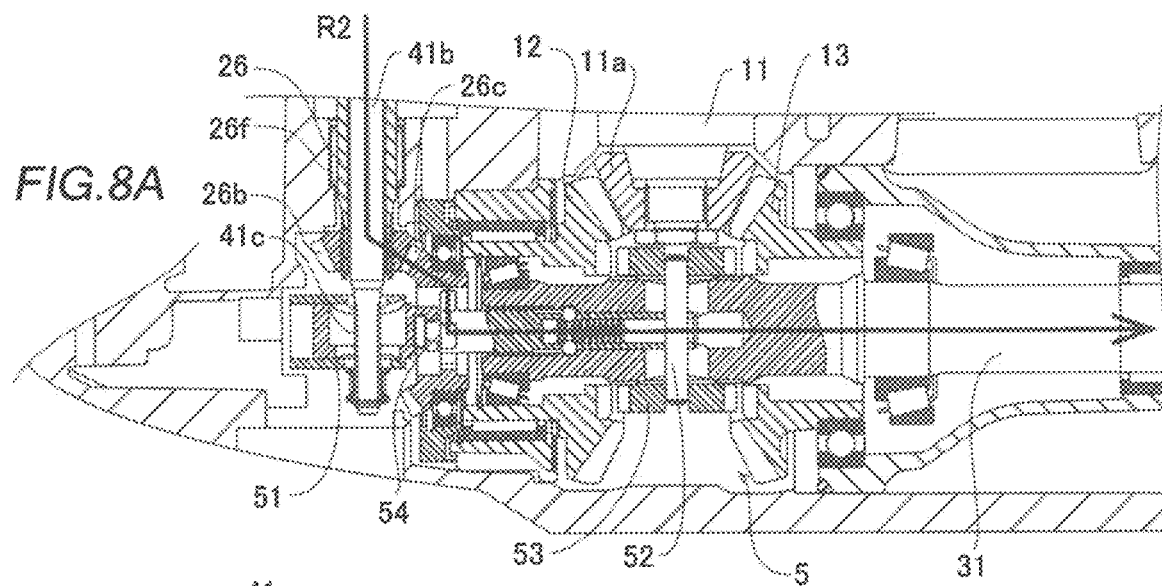
FIG. 8A is a sectional view showing a transmission path to illustrate transmission of a driving force from the electric motor according to the first preferred embodiment of the present invention.
Figure 8B:
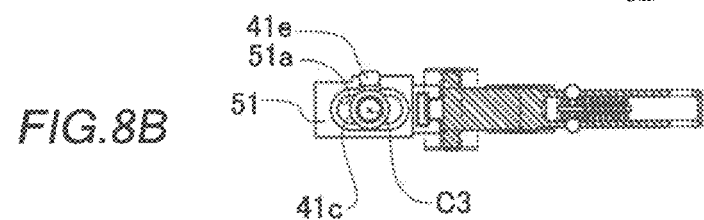
FIG. 8B is a sectional view showing the position of the slider to illustrate transmission of a driving force from the electric motor according to the first preferred embodiment of the present invention.

As shown in FIGS. 6A and 6B, the dog clutches 53 engage with the second front bevel gear 12 when moved forward. As shown in FIGS. 7A and 7B, the dog clutches 53 engage with the second rear bevel gear 13 when moved rearward. As shown in FIGS. 8A and 8B, when the dog clutches 53 are positioned at intermediate positions between the front and the rear, the dog clutches 53 do not engage with the second front bevel gear 12 or engage with the second rear bevel gear 13.

As shown in FIG. 8, the motor clutch 54 engages with the second motor bevel gear 26c when the motor clutch 54 is positioned at an intermediate position between the front and the rear. As shown in FIGS. 6A and 6B and 7, the motor clutch 54 does not engage with the second motor bevel gear 26c when the motor clutch 54 is positioned at either the front or the rear.

FIGS. 6A and 6B show a state in which a driving force is transmitted from the engine 1 to the propeller shaft 31 via the transmission path R1a. When the slider 51 is moved forward, rotation in an r1 direction (see FIG. 1) is transmitted from the second front bevel gear 12 to the dog clutches 53 such that the propeller shaft 31 and the propeller 3 rotate in the r1 direction. Thus, a propulsive force is generated such that the outboard motor 100 moves the marine vessel 102 forward. That is, the outboard motor 100 according to the first preferred embodiment is specified to rotate forward (specified to move forward when the propeller 3 rotates clockwise as viewed from the rear of the outboard motor 100). In such a case, the second front bevel gear 12 functions as a forward gear. In addition, the outboard motor 100 is in a neutral state in which a driving force is not transmitted from the electric motor 2 to the propeller 3.

FIGS. 7A and 7B show a state in which a driving force is transmitted from the engine 1 to the propeller shaft 31 via the transmission path R1b. When the slider 51 is moved rearward, rotation in an r2 direction is transmitted from the second rear bevel gear 13 to the dog clutches 53 such that the propeller shaft 31 and the propeller 3 rotate in the r2 direction. Thus, a propulsive force is generated such that the outboard motor 100 moves the marine vessel 102 rearward. In such a case, the second rear bevel gear 13 functions as a reverse gear. In addition, the outboard motor 100 is in the neutral state in which a driving force is not transmitted from the electric motor 2 to the propeller 3.

FIGS. 8A and 8B show a state in which a driving force is transmitted from the electric motor 2 to the propeller shaft 31 via the transmission path R2. When the slider 51 is positioned at an intermediate position, rotation in the r1 direction or rotation in the r2 direction is transmitted from the second motor bevel gear 26c to the motor clutch 54 such that the propeller shaft 31 and the propeller 3 rotate in the r1 direction or in the r2 direction. Thus, a propulsive force is generated such that the outboard motor 100 moves the marine vessel 102 forward or rearward. In addition, the outboard motor 100 is in a neutral state in which a driving force is not transmitted from the engine 1 to the propeller 3.

As shown in FIG. 1, the cowling 6 houses the engine 1 and the actuator 42. The cowling 6 is disposed above the case 7.

The case 7 includes the lower case 71 and the upper case 72. The lower case 71 is disposed below the upper case 72, and houses the propeller shaft 31. The lower case 71 also houses the transmission shaft 26, the first motor bevel gear 26b, the second motor bevel gear 26c, the drive shaft 11, the first bevel gear 11a, the second front bevel gear 12, the second rear bevel gear 13, and the clutch 5.

As shown in FIG. 3, in the first preferred embodiment, the lower case 71 houses the switching shaft 41 and the transmission shaft 26 in a state in which the switching shaft 41 is disposed inside the transmission shaft 26.

The lower case 71 includes the plate 73 to significantly reduce or prevent the occurrence of cavitation in the vicinity of the propeller 3. The plate 73 is disposed above the propeller 3. The height h1 of the plate 73 is the same or substantially the same as the height of the water surface when the marine vessel 102 is traveling (gliding) in a high-speed range propelled by the outboard motor 100 (during high-speed operation). When the marine vessel 102 travels (glides) in the high-speed range propelled by the outboard motor 100 (during high-speed operation), a driving force is transmitted from the engine 1 to the propeller 3 via the transmission path R1a. When the marine vessel 102 travels in a low-speed range propelled by the outboard motor 100, a driving force is transmitted from the electric motor 2 to the propeller 3 via the transmission path R2.

A portion of the lower case 71 below the plate 73 is positioned below the water surface during both traveling and stopping. Furthermore, a lower portion of the electric motor 2 and the speed reduction gearing 25 are disposed above the plate 73 in the lower case 71.

The upper case 72 houses an upper portion of the electric motor 2 and the water pump 9.

As shown in FIG. 1, the bracket 8 is disposed forward of the cowling 6 and the case 7. The bracket 8 includes a crank 81 fixed to the hull 101 and a tilt shaft 82 that rotates the outboard motor 100 in the trim/tilt direction. The bracket 8 also includes a steering shaft 83 that turns the hull 101 and the anode 84. The steering shaft 83 is a rotary shaft that rotates (turns) the outboard motor 100 in the horizontal direction (steering direction). The steering shaft 83 extends in the upward-downward direction.

Figure 9:
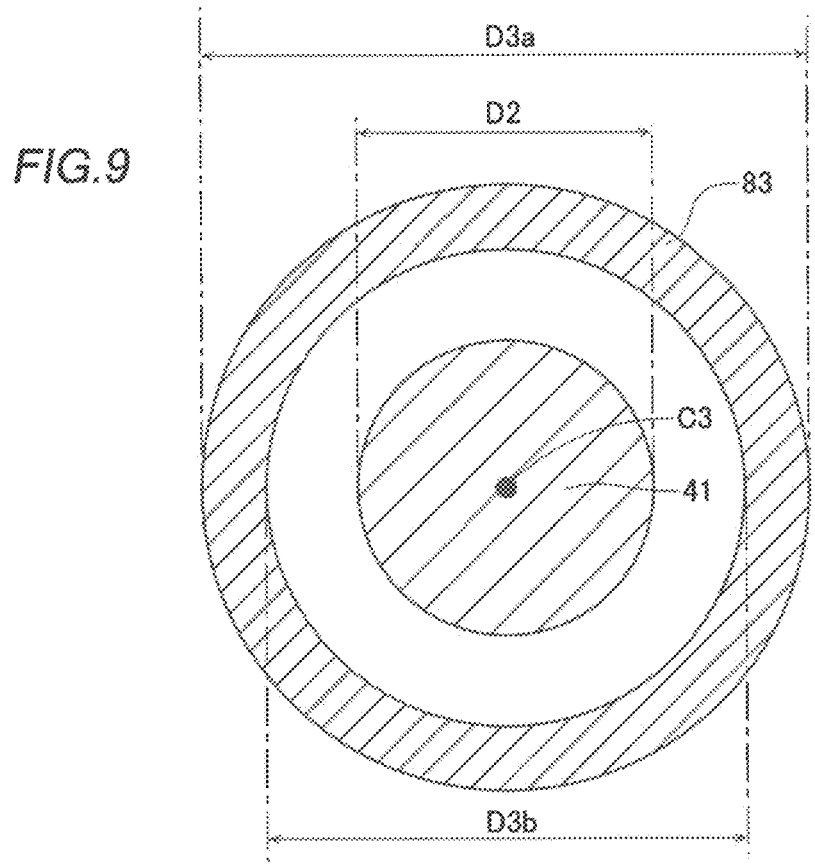
FIG. 9 is a sectional view showing the structure of a steering shaft and the switching shaft according to the first preferred embodiment of the present invention.

As shown in FIG. 9, in the first preferred embodiment, the steering shaft 83 includes a hollow member having a central axis C3. That is, the switching shaft 41, the transmission shaft 26, and the steering shaft 83 are disposed coaxially or substantially coaxially (on the central axis C3). The steering shaft 83 has an outer diameter D3a and an inner diameter D3b larger than the diameter D2 of the switching shaft 41. The switching shaft 41 is disposed inside the steering shaft 83. The switching shaft 41 penetrates the steering shaft 83, and is connected to the actuator 42 disposed in the cowling 6.

As shown in FIG. 1, the anode 84 is disposed below the waterline of the outboard motor 100. The anode 84 protects the case 7 and the bracket 8 from corrosion by undergoing corrosion due to the electrochemical action of seawater instead of the case 7 and the bracket 8.

As shown in FIG. 2, the water pump 9 is attached to the outer peripheral surface of the drive shaft 11, and uses the rotational driving force of the drive shaft 11 to supply water taken in via a water intake (not shown) to the engine 1 via a cooling water passage.

According to the first preferred embodiment of the present invention, the following advantageous effects are achieved.

According to the first preferred embodiment of the present invention, one of the transmission shaft 26 and the switching shaft 41 includes the hollow member, and the other is disposed inside the hollow member. Accordingly, one of the transmission shaft 26 and the switching shaft 41 is disposed inside the other. Consequently, as compared with a case in which the transmission shaft 26 and the switching shaft 41 are disposed side by side in the forward-rearward direction, an increase in the dimensions of the transmission shaft 26 and the switching shaft 41 in the forward-rearward direction in the outboard motor 100 is significantly reduced or prevented. Furthermore, as compared with a case in which the transmission shaft 26 and the switching shaft 41 are disposed side by side in the right-left direction, an increase in the dimensions of the transmission shaft 26 and the switching shaft 41 in the right-left direction in the outboard motor 100 is significantly reduced or prevented. Consequently, an increase in the size of a portion (lower case 71) of the outboard motor 100 that houses the transmission shaft 26 and the switching shaft 41 is significantly reduced or prevented. Thus, even when the electric motor 2 is provided in the outboard motor 100, an increase in the underwater resistance of the portion (lower case 71) positioned in the water is significantly reduced or prevented.

According to the first preferred embodiment of the present invention, the transmission shaft 26 includes the hollow member. Furthermore, the switching shaft 41 is disposed inside the transmission shaft 26, and includes the solid member. Accordingly, the solid switching shaft 41 (or the solid drive shaft 11) is disposed inside the hollow transmission shaft 26, and thus even when the electric motor 2 and the transmission shaft 26 are provided in the outboard motor 100, an increase in the size of the portion (lower case 71) positioned in the water is significantly reduced or prevented. Furthermore, the switching shaft 41 is disposed inside the transmission shaft 26 such that as compared with a case in which the switching shaft 41 and the transmission shaft 26 are disposed side by side in the forward-rearward direction or the right-left direction, an increase in the total size of the switching shaft 41 and the transmission shaft 26 in the forward-rearward direction or an increase in the total size of the switching shaft 41 and the transmission shaft 26 in the right-left direction is significantly reduced or prevented.

According to the first preferred embodiment of the present invention, the switching shaft 41 axially penetrates the transmission shaft 26. Accordingly, even when the actuator 42 that operates the switching shaft 41 is axially spaced apart from the transmission shaft 26, a driving force is easily transmitted to the switching shaft 41 that penetrates the transmission shaft 26.

According to the first preferred embodiment of the present invention, the switching shaft 41 and the transmission shaft 26 are disposed coaxially or substantially coaxially (on the central axis C3). Accordingly, the outer peripheral surface 41d of the switching shaft 41 and the inner peripheral surface 26d of the transmission shaft 26 are close to each other. Consequently, an increase in the size of the transmission shaft 26 in the radial direction is significantly reduced or prevented, and thus an increase in the size of the portion of the outboard motor 100 positioned in the water is further significantly reduced or prevented.

According to the first preferred embodiment of the present invention, the electric motor 2 is disposed forward of or rearward of the transmission shaft 26 and the switching shaft 41. Furthermore, the speed reduction gearing 25 is disposed between the electric motor 2 and the transmission shaft 26 in the forward-rearward direction, and transmits a driving force from the electric motor 2 to the transmission shaft 26. Accordingly, using the reduction mechanism 25, a driving force is easily transmitted from the electric motor 2 to the transmission shaft 26. That is, it is not necessary to prepare an electric motor specially designed for the transmission shaft 26, and thus the outboard motor 100 including the electric motor 2 is easily configured.

According to the first preferred embodiment of the present invention, the speed reduction gearing 25 includes the first gear 25a, the second gear 25b, and the third gear 25c. Accordingly, even when the small electric motor 2 in which the rotational force (torque) of the electric motor 2 is relatively small is used, a driving force is transmitted to the transmission shaft 26 while the rotational force (torque) is increased by the first gear 25a, the second gear 25b, and the third gear 25c. Consequently, the electric motor 2 is downsized, and thus an increase in the size of the outboard motor 100 is significantly reduced or prevented.

According to the first preferred embodiment of the present invention, the electric motor 2 is disposed forward of the transmission shaft 26 and the switching shaft 41. Accordingly, the transmission shaft 26 and the switching shaft 41 are disposed relatively rearward. Therefore, the front end of a lower portion (lower case 71) of the outboard motor 100 in which the transmission shaft 26 and the switching shaft 41 are disposed is positioned relatively rearward. Consequently, when the outboard motor 100 is tilted rearward and upward, an angle required for tilting-up is reduced.

According to the first preferred embodiment of the present invention, the outboard motor 100 includes the plate 73 disposed above the propeller 3. Furthermore, the electric motor 2 and the speed reduction gearing 25 are disposed above the plate 73. Accordingly, the electric motor 2 and the speed reduction gearing 25 are not disposed in a portion of the outboard motor 100 at the same height as or below the plate 73, and thus an increase in the size of the portion at the same height as or below the plate 73 is significantly reduced or prevented. Consequently, even when the electric motor 2 and the speed reduction gearing 25 are provided in the outboard motor 100, an increase in the underwater resistance of the portion at the same height as or below the plate 73 is significantly reduced or prevented.

According to the first preferred embodiment of the present invention, the outboard motor 100 includes the first motor bevel gear 26b and the second motor bevel gear 26c that are disposed in the lower portion of the transmission shaft 26 and transmit a driving force from the transmission shaft 26 to the propeller shaft 31, and the bushing 27 disposed between the outer peripheral surface 41d of the switching shaft 41 and the inner peripheral surface 26d of the transmission shaft 26 and disposed at a position corresponding to the first motor bevel gear 26b and the second motor bevel gear 26c. Accordingly, when a driving force is transmitted from the transmission shaft 26 to the propeller shaft 31, a change in the positional relationship between the transmission shaft 26 and the switching shaft 41 is significantly reduced or prevented by the bushing 27 even when a pressing force is applied to the first motor bevel gear 26b and the second motor bevel gear 26c from the side of the propeller shaft 31.

According to the first preferred embodiment of the present invention, the switching shaft 41 includes the lower portion 41c that protrudes downward from the transmission shaft 26. Furthermore, the outboard motor 100 includes the slider 51 that engages with the lower portion 41c of the switching shaft 41 and is moved by the switching shaft 41, and the clutch 5 that switches between a state in which a driving force is transmitted from the transmission shaft 26 to the propeller shaft 31 and a state in which a driving force is not transmitted according to movement of the slider 51. Accordingly, even when the switching shaft 41 is disposed inside the transmission shaft 26, the slider 51 is moved by the lower portion 41c of the switching shaft 41 without interference of the transmission shaft 26 with the operation of the switching shaft 41 so that the clutch 5 is able to operate.

According to the first preferred embodiment of the present invention, the switching shaft 41 rotates about the central axis C3 of the switching shaft 41 to move the slider 51. Accordingly, the slider 51 is easily moved by rotating the switching shaft 41 disposed inside the transmission shaft 26.

According to the first preferred embodiment of the present invention, the outboard motor 100 includes the water pump 9 driven by rotation of the drive shaft 11. Furthermore, the transmission path R2 through which a driving force is transmitted from the transmission shaft 26 to the propeller shaft 31 is provided separately from the transmission paths R1a and R1b through which a driving force is transmitted from the drive shaft 11 to the propeller shaft 31. Accordingly, a driving force is transmitted from the transmission shaft 26 to the propeller shaft 31 via the transmission path R2 provided separately from the transmission paths R1a and R1b, and thus a driving force is transmitted from the transmission shaft 26 to the propeller shaft 31 without also having to drive the water pump 9. Consequently, a loss of a driving force from the electric motor 2 is reduced.

According to the first preferred embodiment of the present invention, the electric motor 2 and the water pump 9 overlap each other at the predetermined height h2. Accordingly, unlike a case in which the electric motor 2 and the water pump 9 do not overlap each other at the predetermined height h2, an increase in the total size of the electric motor 2 and the water pump 9 in the upward-downward direction (height direction) is significantly reduced or prevented.

According to the first preferred embodiment of the present invention, the outboard motor 100 includes the plate 73 disposed above the propeller 3. Furthermore, at least a portion of the electric motor 2 is disposed above the plate 73. Accordingly, the electric motor 2 is not disposed in a portion of the outboard motor 100 at the same height as or below the plate 73, and thus an increase in the size of the portion at the same height as or below the plate 73 is significantly reduced or prevented. Consequently, an increase in the underwater resistance of the portion at the same height as or below the plate 73 is significantly reduced or prevented even when the electric motor 2 is provided in the outboard motor 100.

According to the first preferred embodiment of the present invention, the outboard motor 100 includes the steering shaft 83 that turns the hull 101. Furthermore, the switching shaft 41, the transmission shaft 26, and the steering shaft 83 are disposed coaxially or substantially coaxially (on the central axis C3). Accordingly, as compared with a case in which the switching shaft 41, the transmission shaft 26, and the steering shaft 83 are disposed on different axes from each other, an increase in the size of the outboard motor 100 in the forward-rearward direction or the right-left direction is significantly reduced or prevented.

According to the first preferred embodiment of the present invention, the outboard motor 100 includes the actuator 42 that moves or rotates the switching shaft 41. Furthermore, at least a portion of the electric motor 2 is disposed below the actuator 42. Accordingly, unlike a case in which the electric motor 2 is disposed above the actuator 42 and the actuator 42 is disposed relatively downward, an increase in the size of the lower portion of the outboard motor 100 is significantly reduced or prevented. Consequently, even when the actuator 42 is provided in the outboard motor 100, an increase in the underwater resistance of the lower portion of the outboard motor 100 is significantly reduced or prevented.

According to the first preferred embodiment of the present invention, the outboard motor 100 includes the cowling 6 that houses the engine 1, the upper case 72 that houses at least a portion of the electric motor 2, and the lower case 71 that houses the switching shaft 41 and the transmission shaft 26 in a state in which the switching shaft 41 is disposed inside the transmission shaft 26. Accordingly, the transmission shaft 26 and the switching shaft 41 disposed inside the transmission shaft 26 are housed in the lower case 71, and thus an increase in the size of the lower case 71 is significantly reduced or prevented. Therefore, even when the electric motor 2 is provided in the outboard motor 100, an increase in the underwater resistance of the lower case 71 is effectively significantly reduced or prevented.

Second Preferred Embodiment

The structure of an outboard motor 200 according to a second preferred embodiment of the present invention is now described with reference to FIGS. 10 and 11. In the second preferred embodiment, an electric motor 202 surrounds the outer periphery of a transmission shaft 226, unlike the first preferred embodiment in which the outboard motor 100 includes the electric motor 2 disposed forward of the transmission shaft 26. In the second preferred embodiment, the same or similar structures as those of the first preferred embodiment are denoted by the same reference numerals, and description thereof is omitted.

Figure 10:
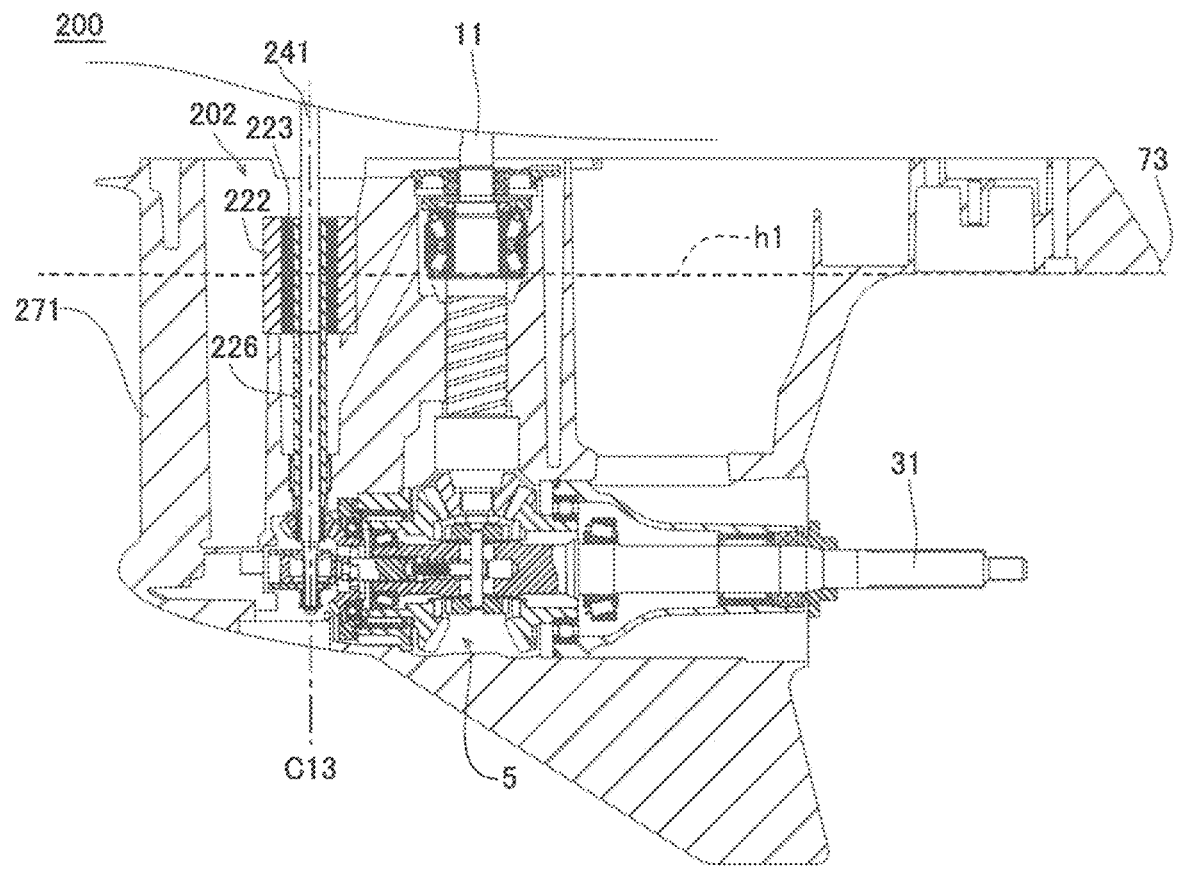
FIG. 10 is a sectional view showing the structure of an outboard motor according to a second preferred embodiment of the present invention.
Figure 11:
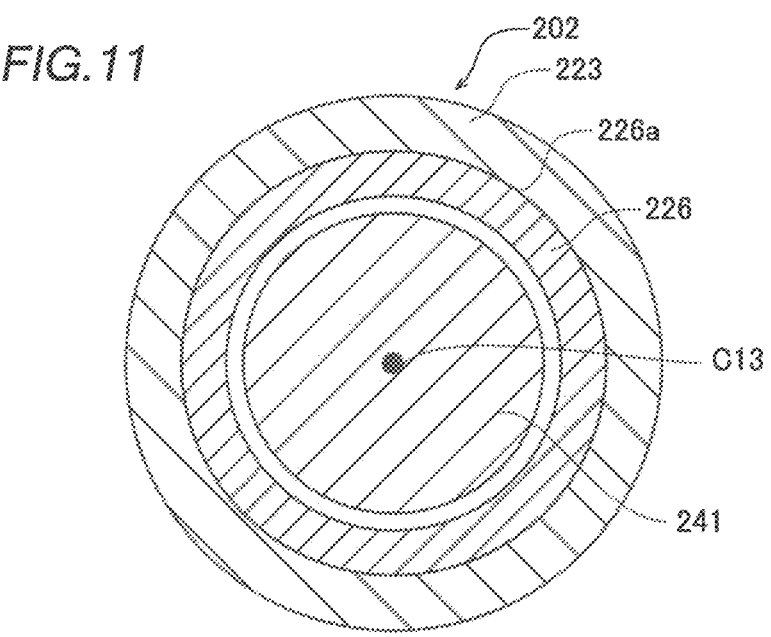
FIG. 11 is a sectional view showing the structure of an electric motor, a transmission shaft, and a switching shaft according to the second preferred embodiment of the present invention.

As shown in FIG. 10, the outboard motor 200 according to the second preferred embodiment includes the electric motor 202, a switching shaft 241, and the transmission shaft 226. As shown in FIG. 11, the electric motor 202 surrounds the outer peripheral surface 226a of the transmission shaft 226. Specifically, a rotor 223 of the electric motor 202 is fixed to the outer peripheral surface 226a of the transmission shaft 226, and the rotor 223 and the transmission shaft 226 rotate integrally. That is, the electric motor 202 is integral and unitary with the transmission shaft 226. Furthermore, a stator 222 of the electric motor 202 is disposed radially outward of the rotor 223. The transmission shaft 226 also serves as a motor shaft of the electric motor 202 itself.

The transmission shaft 226 includes a hollow member. The switching shaft 241 axially penetrates the transmission shaft 226 and the electric motor 202. That is, the rotation axis C13 of the electric motor 202, the central axis of the transmission shaft 226, and the central axis of the switching shaft 241 coincide or substantially coincide with each other. The remaining structures of the second preferred embodiment are similar to those of the first preferred embodiment.

According to the second preferred embodiment of the present invention, the following advantageous effects are achieved.

According to the second preferred embodiment of the present invention, the electric motor 202 surrounds the outer periphery of the transmission shaft 226. Furthermore, the transmission shaft 226 includes the hollow member. In addition, the switching shaft 241 axially penetrates the transmission shaft 226 and the electric motor 202. Accordingly, a transmission path of a driving force from the electric motor 202 to the transmission shaft 226 is simplified. Consequently, the transmission path is simplified such that a loss of transmission of a driving force from the electric motor 202 to the transmission shaft 226 is reduced.

According to the second preferred embodiment of the present invention, the electric motor 202 is integral and unitary with the transmission shaft 226. Accordingly, a transmission that transmits a driving force from the electric motor 202 to the transmission shaft 226 is not necessary. Consequently, the transmission path from the electric motor 202 to the transmission shaft 226 is further simplified, and thus a loss of transmission of a driving force from the electric motor 202 to the transmission shaft 226 is further reduced. The remaining advantageous effects of the second preferred embodiment are similar to those of the first preferred embodiment.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

Figure 12:
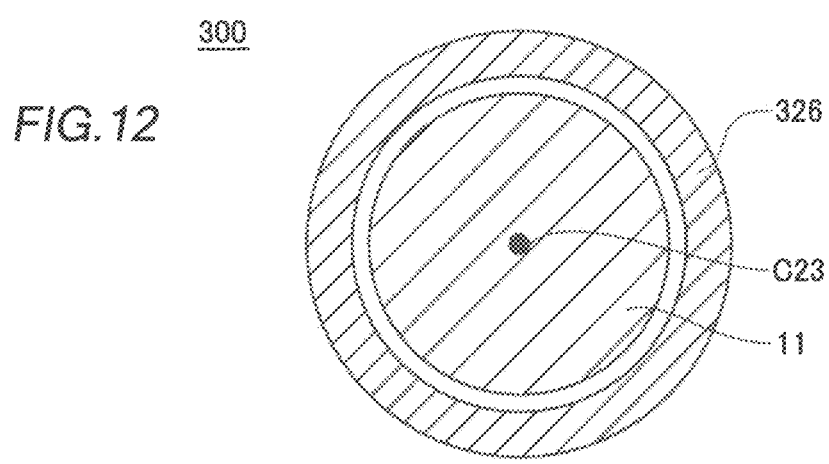
FIG. 12 is a sectional view showing the structure of an outboard motor (transmission shaft) according to a first modified example of the first and second preferred embodiments of the present invention.
Figure 13:
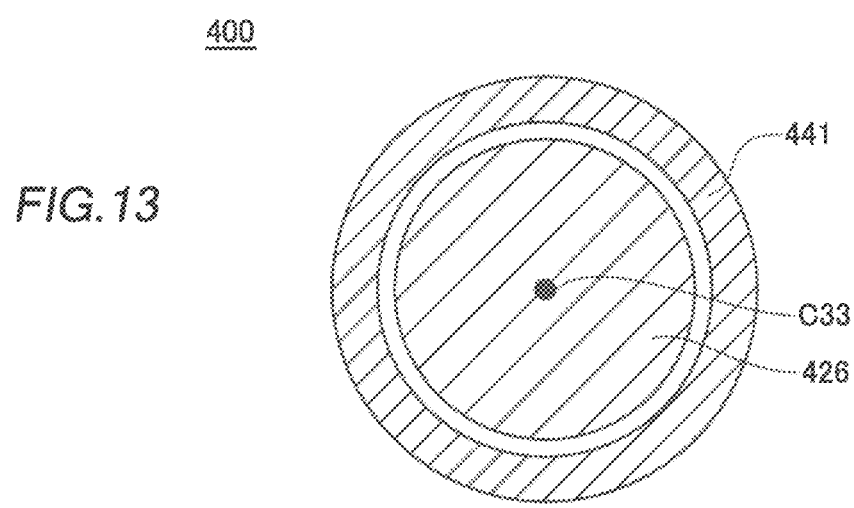
FIG. 13 is a sectional view showing the structure of an outboard motor (transmission shaft) according to a second modified example of the first and second preferred embodiments of the present invention.

For example, while the switching shaft is preferably disposed inside the hollow transmission shaft in each of the first and second preferred embodiments described above, the present invention is not restricted to this. For example, as in an outboard motor 300 according to a first modified example shown in FIG. 12, a drive shaft 11 may alternatively be disposed inside a hollow transmission shaft 326. In such a case, the drive shaft 11 and the transmission shaft 326 are disposed coaxially or substantially coaxially (on a central axis C23). Furthermore, as in an outboard motor 400 according to a second modified example shown in FIG. 13, a transmission shaft 426 may alternatively be disposed inside a hollow switching shaft 441.

Figure 14:
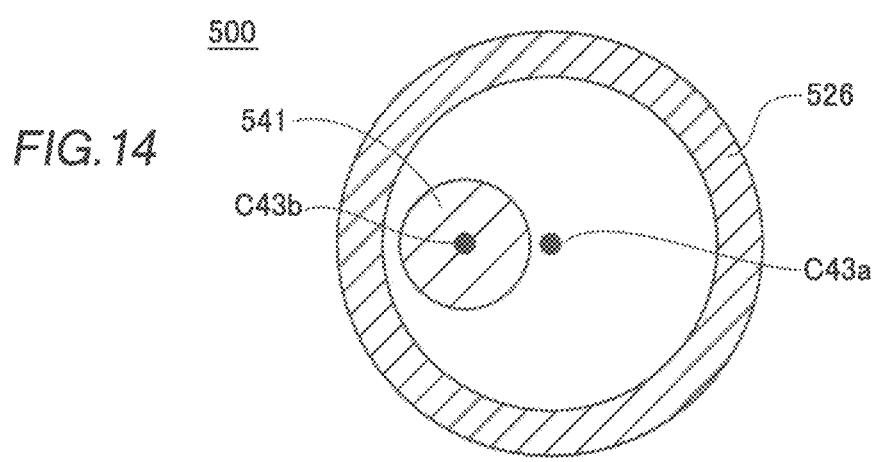
FIG. 14 is a sectional view showing the structure of an outboard motor (transmission shaft) according to a third modified example of the first and second preferred embodiments of the present invention.

While the transmission shaft and the switching shaft are preferably disposed coaxially or substantially coaxially in each of the first and second preferred embodiments described above, the present invention is not restricted to this. For example, as in an outboard motor 500 according to a third modified example shown in FIG. 14, the central axis C43a of a transmission shaft 526 and the central axis C43b of a switching shaft 541 may alternatively be located at different positions (shifted positions) from each other. In such a case, the central axis C43b of the switching shaft 541 is located inside the transmission shaft 526 whereas the central axis C43a of the transmission shaft 526 is located outside the switching shaft 541.

Figure 15:
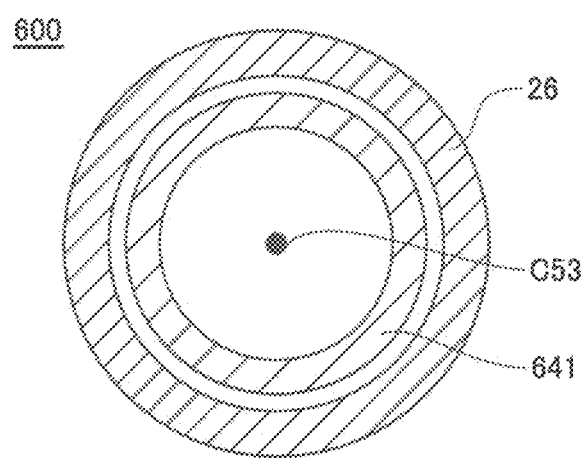
FIG. 15 is a sectional view showing the structure of an outboard motor (transmission shaft) according to a fourth modified example of the first and second preferred embodiments of the present invention.

While the switching shaft disposed inside the transmission shaft is preferably solid in each of the first and second preferred embodiments described above, the present invention is not restricted to this. For example, as in an outboard motor 600 according to a fourth modified example shown in FIG. 15, a switching shaft 641 disposed inside a hollow transmission shaft 26 may alternatively be hollow. In such a case, the hollow transmission shaft 26 and the hollow switching shaft 641 are disposed coaxially or substantially coaxially (on a central axis C53).

While the present invention is preferably applied to an outboard motor as a marine propulsion unit in each of the first and second preferred embodiments described above, the present invention is not restricted to this. For example, the present invention may alternatively be applied to an inboard-outboard motor as a marine propulsion unit.

While the electric motor is preferably disposed forward of the transmission shaft and the switching shaft in the first preferred embodiment described above, and the electric motor is preferably disposed coaxially or substantially coaxially with the transmission shaft and the switching shaft in the second preferred embodiment described above, the present invention is not restricted to this. For example, the electric motor may alternatively be disposed rearward of the transmission shaft and the switching shaft.

While the speed reduction gearing is preferably located in the outboard motor in the first preferred embodiment described above, the present invention is not restricted to this. For example, in the first preferred embodiment described above, the speed reduction gearing may not be provided in the outboard motor, but a transmission mechanism (gearing) having no speed reduction function may alternatively be provided between the electric motor and the transmission shaft.

While the electric motor is preferably disposed above the cavitation plate in each of the first and second preferred embodiments described above, the present invention is not restricted to this. For example, the electric motor may alternatively be disposed at the same height as or below the cavitation plate.

While the bushing is preferably provided between the transmission shaft and the switching shaft in each of the first and second preferred embodiments described above, the present invention is not restricted to this. For example, the bushing may not be provided or a bearing may alternatively be provided.

While the switching shaft preferably rotates to move the slider in each of the first and second preferred embodiments described above, the present invention is not restricted to this. For example, the switching shaft may alternatively move in the upward-downward direction to move the slider.

While the transmission path from the engine and the transmission path from the electric motor are preferably separate from each other in each of the first and second preferred embodiments described above, the present invention is not restricted to this. For example, a driving force from the engine and a driving force from the electric motor may alternatively be combined and transmitted to the propeller.

While the electric motor and the water pump preferably overlap each other at the predetermined height in each of the first and second preferred embodiments described above, the present invention is not restricted to this. For example, the electric motor and the water pump may not overlap each other at the predetermined height.

While the steering shaft, the switching shaft, and the transmission shaft are preferably disposed coaxially or substantially coaxially in each of the first and second preferred embodiments described above, the present invention is not restricted to this. For example, the central axis of the steering shaft may alternatively be located at a different position from those of the central axes of the switching shaft and the transmission shaft.

While the actuator is preferably provided in the cowling, and the actuator is preferably disposed above the electric motor in each of the first and second preferred embodiments described above, the present invention is not restricted to this. For example, the actuator may alternatively be provided in the lower case, and the actuator may alternatively be disposed at the same height as or below the electric motor.

While the outboard motor is preferably specified to rotate forward (specified to move forward when the propeller rotates clockwise (in the r1 direction) as viewed from the rear of the outboard motor) in each of the first and second preferred embodiments described above, the present invention is not restricted to this. For example, the outboard motor may alternatively be specified to rotate reversely (specified to move forward when the propeller rotates counterclockwise (in the r2 direction) as viewed from the rear of the outboard motor). In such a case, the second front bevel gear functions as a reverse gear, and the second rear bevel gear functions as a forward gear. That is, when a driving force is transmitted from the engine to the propeller via the transmission path R1a, the marine vessel moves rearward, and when a driving force is transmitted from the engine to the propeller via the transmission path R1b, the marine vessel moves forward.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine propulsion unit comprising:
   an electric motor;
   an engine;
   a motor driving force transmission shaft that rotates due to a driving force from the electric motor;
   a propeller shaft that rotates together with a propeller; and
   a shaft including one of a switching shaft that switches between a state in which a driving force is transmitted from the engine to the propeller shaft and a state in which a driving force is transmitted from the electric motor to the propeller shaft and a drive shaft that rotates due to a driving force from the engine; wherein
   the drive shaft is provided in a transmission path that transmits the driving force from the engine to the propeller shaft and that is separate from a transmission path that transmits the driving force from the electric motor to the propeller shaft; and
   one of the motor driving force transmission shaft and the shaft includes a hollow member, and the other of the motor driving force transmission shaft and the shaft is disposed inside the hollow member.

2. The marine propulsion unit according to claim 1, wherein
   the motor driving force transmission shaft includes the hollow member; and
   the shaft is disposed inside the motor driving force transmission shaft, and includes a solid member.

3. The marine propulsion unit according to claim 2, wherein the shaft axially penetrates the motor driving force transmission shaft.

4. The marine propulsion unit according to claim 2, wherein
   the shaft includes the switching shaft; and
   the switching shaft is disposed inside the motor driving force transmission shaft.

5. The marine propulsion unit according to claim 4, wherein the switching shaft and the motor driving force transmission shaft are disposed coaxially or substantially coaxially.

6. The marine propulsion unit according to claim 1, wherein
   the electric motor is disposed forward of or rearward of the motor driving force transmission shaft and the shaft; and
   the marine propulsion unit further comprises a first motor gearing disposed between the electric motor and the motor driving force transmission shaft in a forward-rearward direction of the marine propulsion unit to transmit the driving force from the electric motor to the motor driving force transmission shaft.

7. The marine propulsion unit according to claim 6, wherein the first motor gearing includes a speed reducer.

8. The marine propulsion unit according to claim 6, wherein the electric motor is disposed forward of the motor driving force transmission shaft and the shaft.

9. The marine propulsion unit according to claim 6, further comprising an anti-cavitation plate disposed above the propeller; wherein the electric motor and the first motor gearing are disposed above the anti-cavitation plate.

10. The marine propulsion unit according to claim 1, wherein
the electric motor surrounds an outer periphery of the motor driving force transmission shaft;
the motor driving force transmission shaft includes the hollow member; and
the shaft axially penetrates the motor driving force transmission shaft and the electric motor.

11. The marine propulsion unit according to claim 10, wherein the electric motor is integral and unitary with the motor driving force transmission shaft.

12. The marine propulsion unit according to claim 1, wherein
the motor driving force transmission shaft includes the hollow member;
the shaft is disposed inside the motor driving force transmission shaft; and
the marine propulsion unit further comprises:
a second motor gearing disposed in a lower portion of the motor driving force transmission shaft to transmit a driving force from the motor driving force transmission shaft to the propeller shaft; and
a cylindrical member disposed between an outer peripheral surface of the shaft and an inner peripheral surface of the motor driving force transmission shaft, the cylindrical member being disposed at a position corresponding to the second motor gearing.

13. The marine propulsion unit according to claim 1, wherein
the shaft includes the switching shaft;
the switching shaft includes a protrusion that protrudes downward from the motor driving force transmission shaft; and
the marine propulsion unit further comprises:
a slider that engages with the protrusion of the switching shaft and able to be moved by the switching shaft; and
a clutch that switches between a state in which a driving force is transmitted from the motor driving force transmission shaft to the propeller shaft and a state in which a driving force is not transmitted from the motor driving force transmission shaft to the propeller shaft according to movement of the slider.

14. The marine propulsion unit according to claim 13, wherein the switching shaft rotates about a central axis of the switching shaft to move the slider.

15. The marine propulsion unit according to claim 1, further comprising:
a water pump driven by rotation of the drive shaft;
a first transmission path through which a driving force is transmitted from the drive shaft to the propeller shaft; and
a second transmission path that is provided separately from the first transmission path and through which a driving force is transmitted from the motor driving force transmission shaft to the propeller shaft.

16. The marine propulsion unit according to claim 15, wherein the electric motor and the water pump overlap each other at a predetermined height of the marine propulsion unit.

17. The marine propulsion unit according to claim 1, further comprising an anti-cavitation plate disposed above the propeller; wherein
at least a portion of the electric motor is disposed above the anti-cavitation plate.

18. The marine propulsion unit according to claim 1, further comprising:
a steering shaft to turn a hull; wherein
the shaft, the motor driving force transmission shaft, and the steering shaft are disposed coaxially or substantially coaxially.

19. The marine propulsion unit according to claim 1, further comprising:
an actuator to move or rotate the switching shaft; wherein
the shaft includes the switching shaft; and
at least a portion of the electric motor is disposed below the actuator.

20. The marine propulsion unit according to claim 1, wherein
the motor driving force transmission shaft includes the hollow member; and
the marine propulsion unit further comprises:
a cowling that houses the engine;
an upper case that houses at least a portion of the electric motor; and
a lower case that houses the shaft and the motor driving force transmission shaft in a state in which the shaft is disposed inside the motor driving force transmission shaft.

* * * * *